UNITED STATES PATENT OFFICE.

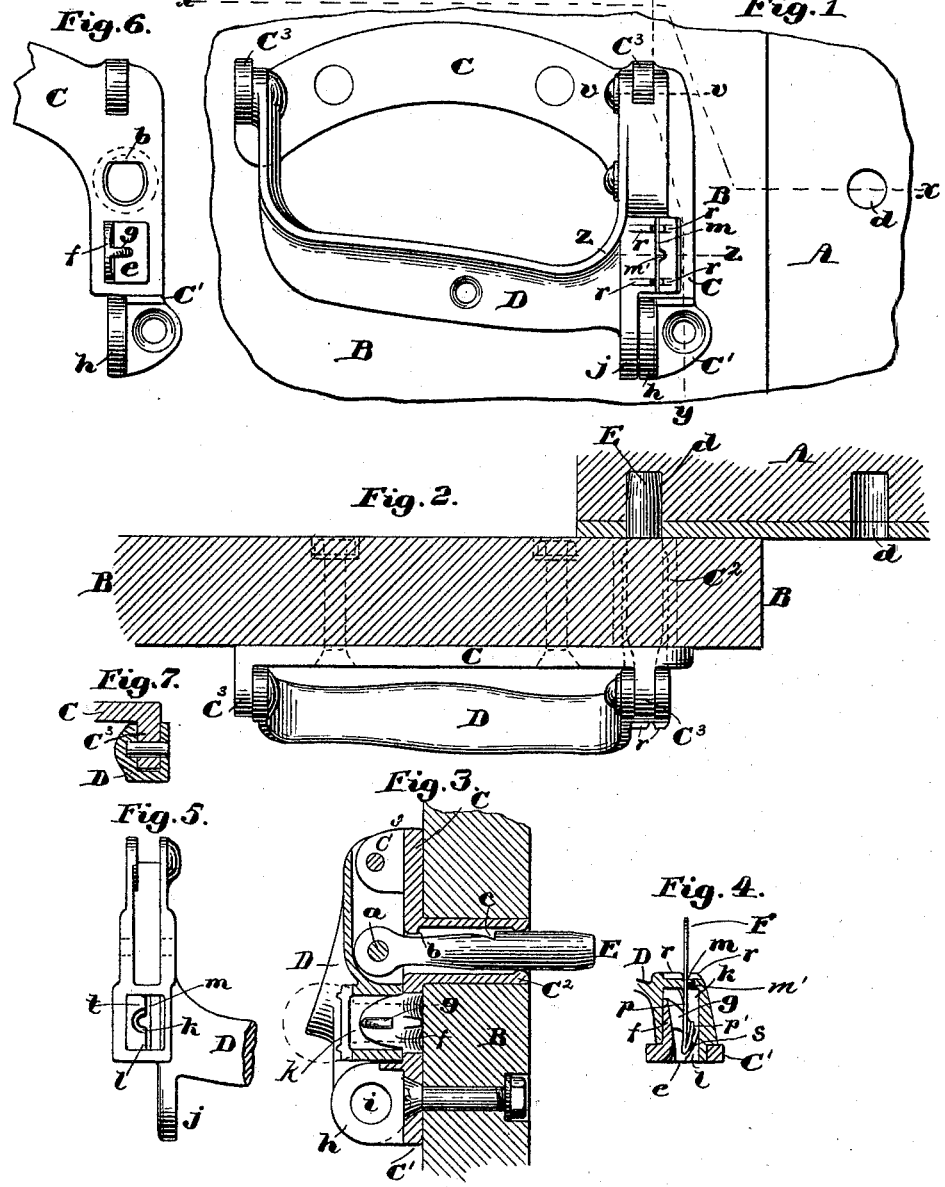

MORRIS E. KANALY, OF SOMERVILLE, MASSACHUSETTS.

SEAL-LOCK.

SPECIFICATION forming part of Letters Patent No. 606,418, dated June 28, 1898.

Application filed September 1, 1897. Serial No. 650,271. (No model.)

*To all whom it may concern:*

Be it known that I, MORRIS E. KANALY, of Somerville, in the county of Middlesex and State of Massachusetts, have invented certain new and useful Improvements in Seals and Seal-Locks, of which the following, taken in connection with the accompanying drawings, is a specification.

My invention relates to seals and seal-locks for sliding doors and other purposes, is designed especially for use on freight-car doors, and is an improvement upon the invention shown and described in the Letters Patent No. 558,181, granted to me April 14, 1896; and it consists in certain novel features of construction, arrangement, and combination of parts, which will be readily understood by reference to the description of the accompanying drawings, and to the claims hereto appended, and in which my invention is clearly pointed out.

Figure 1 of the drawings is an elevation of a small portion of a freight-car body and its door with my improved seal-lock applied thereto in closed position. Fig. 2 is a sectional plan of the same parts, the cutting plane being on line $xx$ on Fig. 1. Fig. 3 is a section on line $yy$ on Fig. 1, looking toward the left of Fig. 1, with the seal indicated in position by dotted lines. Fig. 4 is a section on line $zz$ on Fig. 1. Fig. 5 is a back side elevation of a portion of the right-hand end of the bolt-operating handle. Fig. 6 is an elevation of a portion of the pendent arm of the handle-carrying plate. Fig. 7 is a section on line $vv$ on Fig. 1, and Fig. 8 is a perspective view of the seal.

In the drawings, A represents a small portion of the car-body at one side of the door-opening, and B is a small portion of the door.

C is a plate bolted firmly to the exterior of the door B and provided with the pendent arm C', the perforated hub C², and the ears C³ C³, to which is pivoted the bail-like handle D, and E is the bolt, having a bearing in the hub C² and pivoted by the fixed pin $a$ to the handle D, all of which, except as hereinafter described, are constructed, arranged, and operated substantially as in my before-cited patent.

The bearing in the hub C² instead of being of uniform diameter, as in my before-cited patent, has a larger diameter at its outer end than at its inner end and is provided at its outer end with the rib or shoulder $b$, extending across the upper side of said bearing, as shown in Figs. 3 and 6.

The bolt E instead of being made of a uniform diameter, except having a slightly-tapered inner end, as in my prior patent before cited, is reduced in diameter between the middle of its length and its pivotal connection to the handle D, and has a shoulder $c$ upon its upper side adapted to engage the shoulder $b$ in the hub C² when the bolt E is entirely withdrawn from the socket $d$, formed in the wall of the car-body, and said bolt is pivoted to the handle by a fixed pin set firmly in said handle and movable slightly in the bolt instead of the pin being fixed in the bolt and projecting into and movable in slots in the handle, as in said prior patent.

The pendent arm C' is provided with the rectangular opening $e$ just below the bearing in the hub C² and at the inner side of said opening has formed integral therewith a single outwardly-projecting ear $f$, which has formed upon its side next the opening $e$ the triangular lug or tooth $g$, which projects over the opening $e$ and has its inner edge inclined to a limited extent to the face of said arm C' and its outer face inclined to a greater extent, as shown in Fig. 4. The pendent arm C' is also provided with the outwardly-projecting ear $h$ at its lower end and inner side, which has a lateral opening $i$, through which and a corresponding opening in a similar ear $j$ on the handle D the bow of a padlock (not shown) may be passed to lock said handle against displacement.

The handle D has a chamber $k$ formed in the inner face of one of its end portions of sufficient size to receive the ear $f$ and its tooth $g$, said chamber extending from the inner face of said handle nearly to its outer face and having its open end contracted laterally by two curved surfaces $ll$ on the outer or right-hand wall of said chamber, as shown in Figs. 4 and 5. A slot $m$ is cut through the outer or front wall of said chamber in a vertical plane and extends beyond the vertical length of said chamber, said slot serving as a means of inserting the seal into said chamber and the portions extending above and below said chamber serving to receive the broader portion of the seal and to limit the depth to which said seal can be inserted.

It will be noticed that the tooth $g$ projects outward from the ear $f$ to a point beyond the plane of the slot $m$ and that the curved surfaces $l\ l$ on the outer or right-hand wall of the chamber $k$ extend inward to the plane of said slot, as shown in Fig. 4.

F is a seal made of thin sheet material provided with the shoulders $n\ n$, which extend into and rest upon the bottom of the portions of the slot $m$ which extend above and below the chamber $k$ to limit the inward movement of said seal. The seal has a portion $p'$ of its shank $p$ folded upon the main body thereof, but slightly diverging therefrom, the main body having the slot $o$ cut through it, and the folded-over portion having a notch or open slot $o'$ cut in its upper end, the bottom of which coincides with the lower end of the slot $o$, the lower ends of both of said slots being at a distance from the shoulders $n\ n$ corresponding to the distance from the under side of the tooth $g$ to the bottom of the upper and lower portions of the slot $m$. The shank $p$ of the seal F also has cut through it a slit between the top of the slot $o$ and the level of the shoulders $n\ n$, said slit being of crescent shape, as shown, or of any other desired shape that will extend around three sides of a portion $p^2$ of the stock, which is inclined outward on the side of said shank opposite to the folded-over portion $p'$. The object of this slit around the portion $p^2$ of the shank $p$ and the angular position of the portion $p^2$ relative to the main body of said shank is to provide another engaging point to insure the locking of the bolt by the engagement of the part $p^2$ with the inner surface of the outer wall or cover of the chamber $k$ at the side of the slot $m$ opposite the point of the tooth $g$, which part $p^2$ also serves the purpose of preventing a thin blade of steel being inserted in the slot $m$ on that side of the seal and disengaging the parts $p$ and $p'$ from engagement with the tooth $g$ and also to weaken the shank, so it will break at that point when the handle is forcibly lifted.

The pins connecting the handle D to the plate C are tight in the ears $C^3$ and loose in the handle, and the pin connecting the bolt to the handle is tight in the handle and loose in the bolt, and the holes in the handle which receive said pins are closed at one end, so that said pins cannot be driven out or withdrawn.

The handle D has formed upon its outer surface on opposite sides of the slot $m$ outwardly-projecting lugs $r\ r$, the ends of which that are toward the slot $m$ are beveled or inclined toward said slot, as shown in Figs. 1 and 4, for the purpose of assisting in guiding the end of the seal into said slot $m$, particularly when this operation has to be performed in a dim light.

It is preferable to have the seal inserted in the slot $m$ with the folded portion $p'$ of the shank $p$ toward the right of Fig. 1, and to insure this being done I form on the outer surface of the part $p'$ an outwardly-projecting hemispherical boss $s$, and at the center of the slot $m$ I form a semicircular enlargement $m'$ of said slot, upon the side thereof toward the right of Fig. 1, of just sufficient size to permit the passage of the boss $s$; but if the seal is turned the other side to, it cannot be inserted in the slot $m$, because the boss $s$ will strike on the metal on the left side of the slot. I also form a similar boss $s'$ upon the head portion of the seal just above the level of the shoulders $n\ n$, which when said shoulders abut against the bottom of the end portions of the slot $m$ will fill said enlargement $m'$ and thus render it impossible for the seal to be tampered with by inserting a steel wire through said enlargement.

The head portion of the seal F has embossed thereon during the operation of manufacturing the same the name of the individual, firm, or corporation who is to use the same.

The operation of my invention is as follows: The door of the car being closed or partially closed, as may be desired, and the bolt E being projected by moving the handle D about its axis of motion into the position shown in the drawings, with the chamber $k$ inclosing the ear $f$ and tooth $g$, the folded shank of the seal F is passed through the slot $m$, and as it is pushed inward its folded end comes in contact with the inclined upper edge of the tooth $g$ and is deflected toward the right of Figs. 1 and 4 until its folded end engages the curved surface $l\ l$, when the shank is bent in the opposite direction, so that an edge view of the seal would present a curve substantially an arc of a circle; but when the seal is inserted until the shoulders $n\ n$ limit further movement the bottoms of the slots $o$ and $o'$ will have passed below the bottom or inner face of the tooth $g$, the spring of the material will cause the main body $p$ of the shank to assume its normal or straight position, and the bottoms of both slots $o$ and $o'$ will be directly beneath the tooth $g$, as shown in Fig. 4, and the part $p^2$ will have snapped beneath the outer wall or cover of the chamber $k$, all as shown in Fig. 4.

The notch $c$ in the bolt E engages the shoulder $b$ in the hub $C^2$ when the handle is lifted to a sufficient extent to withdraw said bolt from the socket $d$.

The advantage of applying the pins which connect the handle D to the ears $C^3$ and the bolt E as herein described, and shown in the drawings, is that they cannot be driven out or otherwise withdrawn.

What I claim as new, and desire to secure by Letters Patent of the United States, is—

1. A seal for seal-locks made of a thin flat sheet of material comprising a shank-section, the end portion of which is folded upon its main body into a position slightly diverging therefrom and having a notch or open slot formed in the end of said folded-over portion, and a slot cut through the main body of said shank with its lower end coinciding with the lower end of the notch in the folded-over portion; a head-section having shoulders to limit the inward movement of said seal; and a portion of said shank near the level of said shoulders partially severed from the main body of said shank and bent outward into an inclined position upon the side of said shank opposite to the folded-over section at its lower end.

2. A seal for seal-locks comprising a shank-section the end portion of which is folded upon the main body but slightly diverging therefrom, and having a notch or open slot formed in the upper end of said folded-over portion, and a slot cut through the main body of said shank with its lower end coinciding with the lower end of the notch in said folded-over portion; a head-section having shoulders to limit the depth to which said seal may be inserted into the chambered handle; an outwardly-projecting boss or lug on the folded-over portion of the shank; and a corresponding boss upon the head-section just above the level of its shoulders, as and for the purposes described.

3. In a seal-lock the combination of the plate C C' provided with the tubular hub C² having the shoulder $b$ in the outer end of its bore; the handle D pivoted to said plate; and the bolt E provided with the shoulder $c$ to engage the shoulder $b$ and pivoted to said handle by a pin fixed in said handle.

4. In a seal-lock the combination of the plate C C' provided with the rectangular opening $e$ and having the single ear $f$ at one side of said opening; the tooth $g$ projecting from said ear over said opening; the handle D provided on its inner face with the chamber $k$, the slot $m$, and the inclined surfaces $l, l,$ within said chamber; and a seal having a head portion provided with the shoulders $n, n$, the shank portions $p,$ and $p'$ the latter folded upon the former and provided with the notch $o'$ and the former provided with slot $o$, all constructed arranged and operating substantially as described.

5. In a seal-lock the combination of the plate C C' provided with the ear $f$ having the tooth $g$ projecting laterally therefrom; the handle D provided with the chamber $k$ having the curved surfaces $l\ l$ therein, and with the slot $m$ having the enlargement $m'$ on one side thereof; and a seal having a head-section provided with the shoulders $n, n,$ and a shank composed of the parts $p$ and $p'$ provided respectively with the slot $o$ and notch $o'$; and the hemispherical bosses $s$ and $s'$ projecting from the shank portion $p'$ and the head of the seal respectively.

6. In a seal-lock the combination of the plate C C' provided with the perforated hub C²; the bolt E; the handle D pivoted to said plate and bolt by pins set in fixed positions in holes in said handle that extend only part way through said handle in such a manner that said pins cannot be driven out of, or withdrawn from, said handle.

7. In a seal-lock the combination of the plate C C' having the outwardly-projecting ear $f$ and the tooth $g$; the handle D provided with the chamber $k$, the inclined surfaces $l, l,$ within said chamber and the seal-receiving slot $m$; and the ribs $r, r,$ projecting outward from the outer face of said handle on opposite sides of said slot $m$ and having their contiguous ends beveled as shown.

In testimony whereof I have signed my name to this specification, in the presence of two subscribing witnesses, on this 30th day of August, A. D. 1897.

MORRIS E. KANALY.

Witnesses:
N. C. LOMBARD,
HANFORD T. CROSBY.